United States Patent
Sano et al.

(10) Patent No.: US 7,463,763 B2
(45) Date of Patent: Dec. 9, 2008

(54) APPARATUS, METHOD, AND PROGRAM FOR ASSISTING IN SELECTION OF PATTERN ELEMENT FOR PATTERN MATCHING

(75) Inventors: Hiroshi Sano, Kyoto (JP); Yumi Hayakawa, Kyoto (JP); Atsushi Imamura, Kyoto (JP); Eiji Nishihara, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 559 days.

(21) Appl. No.: 11/098,388

(22) Filed: Apr. 5, 2005

(65) Prior Publication Data

US 2005/0259874 A1 Nov. 24, 2005

(30) Foreign Application Priority Data

May 20, 2004 (JP) .............................. P2004-149859

(51) Int. Cl.
*G06K 9/00* (2006.01)
(52) U.S. Cl. ..................... 382/144; 382/145; 382/147; 382/149; 382/209; 382/218
(58) Field of Classification Search ................. 382/141, 382/144–145, 147, 149, 209, 218
See application file for complete search history.

(56) References Cited

U.S. PATENT DOCUMENTS

| 6,021,221 | A * | 2/2000 | Takaha ........................ 382/199 |
| 6,950,548 | B1 * | 9/2005 | Bachelder et al. ............ 382/145 |
| 2002/0085761 | A1 * | 7/2002 | Cao et al. .................... 382/209 |

FOREIGN PATENT DOCUMENTS

JP          5-6421          1/1993

* cited by examiner

*Primary Examiner*—Matthew C. Bella
*Assistant Examiner*—John B Strege
(74) *Attorney, Agent, or Firm*—McDermott Will & Emery LLP

(57) ABSTRACT

A pattern-element extractor (51), one of functions implemented by a computer, extracts a plurality of pattern elements from a reference image, a region of which is displayed on a display (45). An input part (46) accepts an operator's selection of one out of the plurality of pattern elements as a reference pattern element, and a distinguishability checker (52) checks whether the selected pattern element is distinguishable from the other pattern elements and usable as the reference pattern element for pattern matching. A result of the check is notified to the operator, and an appropriate one out of the pattern elements in the reference image can be selected as the reference pattern element, by referring to the result of the check made by the distinguishability checker (52). Thus, misrecognition of the reference pattern element used for detecting a position of a target image relative to the reference image in pattern matching is prevented.

21 Claims, 9 Drawing Sheets

APPARATUS, METHOD, AND PROGRAM FOR ASSISTING IN SELECTION OF PATTERN ELEMENT FOR PATTERN MATCHING

BACKGROUND OF THE INVENTION

1. Field of the Invention

The present invention relates to a technique for assisting an operator in selecting a pattern element(s) out of pattern elements in a reference image, as a reference pattern element(s) used for detection of a position of a target image relative to a reference image by pattern matching.

2. Description of the Background Art

Conventionally, detection of a position of a target image relative to a reference image has been accomplished by pattern matching. For the detection, a pattern element is designated as a reference pattern element for pattern matching by an operator. For example, in testing a pattern formed on a printed wiring board, a semiconductor substrate, a glass substrate, or the like (which will be hereinafter referred to as a "substrate"), a non-defective substrate on which the same pattern as the pattern on the substrate being tested is formed is prepared, and an image of a region including a desired portion in the pattern formed on the non-defective substrate is previously captured to provide a color reference image. Subsequently, the color reference image is binarized, and a pattern element found in the desired portion in a resultant binary color reference image is designated as a reference pattern element by an operator. Then, a position of a target image which is obtained by capturing an image of the substrate being tested, relative to the reference image, is detected by pattern matching using the pattern element designated as the reference pattern element. As a result, a device for capturing the image of the substrate is accurately located in a desired position above the substrate (in other words, a device for capturing the image of the substrate is appropriately aligned to the substrate), and a test on the pattern on the substrate is carried out.

According to a method disclosed in Japanese Patent Application Laid-Open No. 5-6421 (which will be hereinafter referred to as "JP No. 5-6421"), a plurality of membership functions respectively corresponding to a plurality of values representing geometric features of various model pattern elements are prepared, and a degree of conformity of each of a plurality of pattern elements in a binary target image to each of the model pattern elements (in other words, a degree to which each of a plurality of pattern elements in a binary target image agrees with each of the model pattern elements, which will be hereinafter referred to as a "conformity degree") is determined by substituting the values representing geometric features into the membership functions. Then, the resultant conformity degrees are compared with one another for each of the plurality of pattern elements, to identify a category of any of the model pattern elements to which the pattern element belongs.

When the target image includes other pattern elements which are similar to the pattern element designated as the reference pattern element, the position of the target image relative to the reference image cannot be accurately detected in pattern matching due to misrecognition of the reference pattern element in some cases. One solution to prevent misrecognition of the reference pattern element is to have the operator confirm whether or not a pattern element possibly causing misrecognition is present around the pattern element designated as the reference pattern element in the reference image. However, it is not easy to determine whether or not one pattern element is supposed to actually cause misrecognition, and thus the foregoing solution requires complicated tasks on the part of the operator.

SUMMARY OF THE INVENTION

The present invention is directed to an apparatus for assisting in selecting a pattern element (or pattern elements) from a reference image as a reference pattern element (or reference pattern elements) used for detecting a position of a target image relative to the reference image by pattern matching, and it is an object of the present invention to prevent misrecognition of the reference pattern element in pattern matching.

The apparatus according to the present invention includes a pattern-element extractor for extracting a plurality of pattern elements from a reference image, a distinguishability checker for checking whether or not one of the plurality of pattern elements is distinguishable from the other pattern elements and usable as a reference pattern element for pattern matching, a display for displaying at least part of the reference image, and an input part for accepting an operator's selection of a pattern element out of the plurality of pattern elements as a reference pattern element in pattern matching.

According to the present invention, it is possible to select an appropriate pattern element from the reference image as the reference pattern element by referring to a result of the check, to thereby prevent misrecognition of the reference pattern element.

According to one aspect of the present invention, when the result of the check is in the negative, the input part accepts the operator's selection of another pattern element out of the plurality of pattern elements, and the distinguishability checker checks whether or not a combination of two pattern elements selected by the operator is distinguishable from all the other combinations of two pattern elements out of the plurality of pattern elements, using a positional relationship between the two pattern elements selected by the operator.

As a result, two pattern elements for the reference pattern elements can be efficiently selected. Alternatively, three or more pattern elements may be selected.

According to another aspect of the present invention, the distinguishability checker checks whether or not each of the plurality of pattern elements is distinguishable from the other pattern elements, and the apparatus further comprises a display controller for indicating a result of the check made by the distinguishability checker in association with each pattern element displayed on the display. As a result, a pattern element as the reference pattern element can be easily selected.

Preferably, the display displays a region other than a peripheral region of the reference image, and a pattern element included in the region out of the plurality of pattern elements is a target of the operator's selection. As a result, a pattern element as the reference pattern element can be selected while allowing for misalignment of the target image, to thereby further reliably prevent misrecognition of the reference pattern element in pattern matching.

The present invention is also directed to a method of assisting in selecting a pattern element from a reference image as a reference pattern element for pattern matching, and a computer-readable medium carrying a program for performing steps in the method with a computer.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
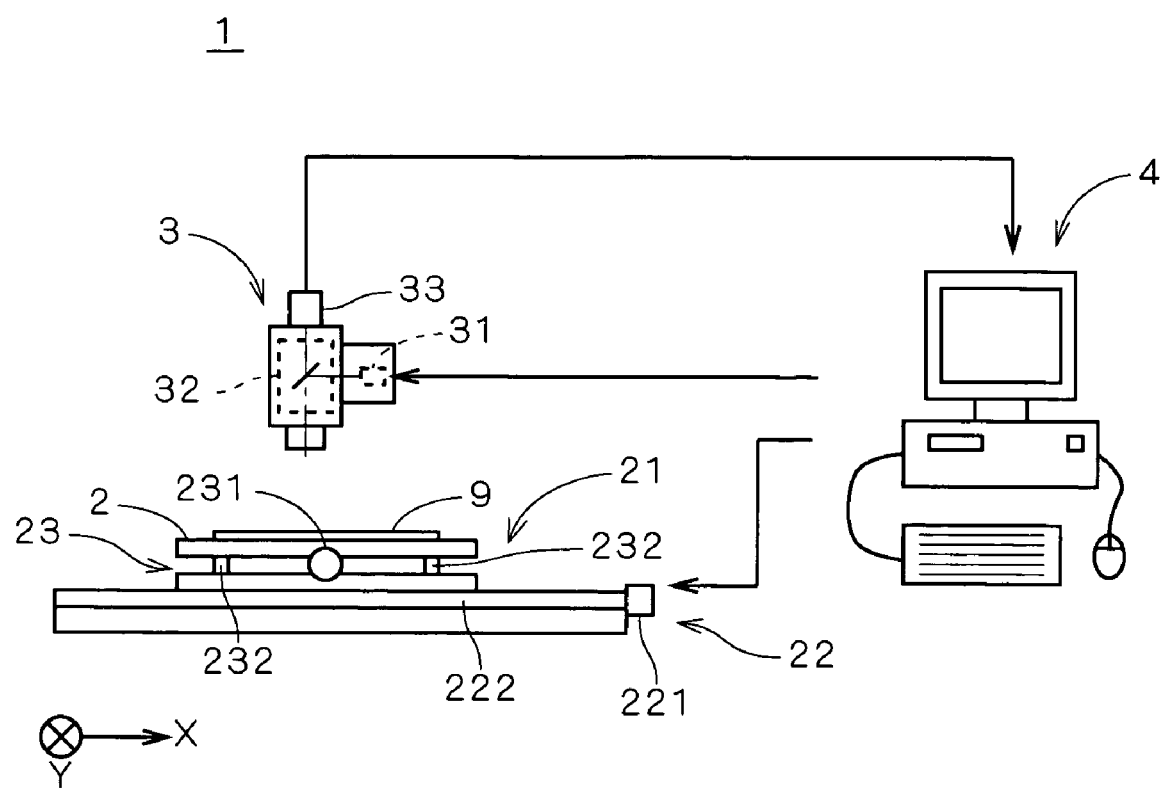
FIG. 1 illustrates a structure of a defect detection apparatus.

FIG. 1 illustrates a structure of a defect detection apparatus 1 according to a first preferred embodiment of the present invention. The defect detection apparatus 1 includes a stage 2 for holding a printed wiring board (which will be hereinafter referred to as a "board") 9 on which a pattern including wires (traces) is formed, an image capture unit 3 for capturing an image of the board 9 to provide a color image (or a monochrome gray-scale image) of the board 9, a stage driver 21 for moving the stage 2 relative to the image capture unit 3, and a computer 4 including a CPU for performing various operations, a memory for storing various kinds of information, and the like. The computer 4 functions as a controller for controlling each of elements forming the defect detection apparatus 1. It is noted that where the terms, "color image" will be used in the present specification, a monochrome gray-scale image may alternatively be provided as noted above.

The image capture unit 3 includes an illumination part 31 for emitting an illumination light, an optical system 32 for guiding the illumination light toward the board 9 and receiving a light from the board 9, and an image capture device 33 for converting an image of the board 9 which is formed by the optical system 32 into an electrical signal, and outputting data of a color image. The stage driver 21 includes an X-direction moving mechanism 22 for moving the stage 2 in a direction indicated by an arrow X in FIG. 1 ("X direction") and a Y-direction moving mechanism 23 for moving the stage 2 in a direction indicated by an arrow Y in FIG. 1 ("Y direction"). The X-direction moving mechanism 22 includes a motor 221 connected with a ball screw (not illustrated). Rotation of the motor 221 causes the Y-direction moving mechanism 23 to move in the X direction in FIG. 1 along guide rails 222. The Y-direction moving mechanism 23 has the same structure as that of the X-direction moving mechanism 22. Rotation of a motor 231 of the Y-direction moving mechanism 23 causes the stage 2 to move in the Y direction along guide rails 232 via a ball screw (not illustrated).

In the defect detection apparatus 1 illustrated in FIG. 1, the board 9 prepared as a target of a test is placed on the stage 2 by an external carrying mechanism, and an image of the board 9 is captured, so that a color image is provided. (In the present specification, a color image of the board 9 prepared as a target of a test will be referred to as a "target image".) Subsequently, the target image is binarized by a pattern matching unit (not illustrated) of the defect detection apparatus 1. Then, pattern matching using a reference pattern element(s) which is previously supplied by selecting a pattern element(s) out of pattern elements in a reference image by means of the following processes is carried out on a resultant binary target image, so that a position of the target image relative to the reference image (i.e., a positional difference) is detected. Thereafter, the image capture unit 3 is accurately located in a desired position above the board (in other words, the image capture unit 3 is appropriately aligned to the board 9) based on the detected position of the target image relative to the reference image, and detection of a defect in a pattern formed on the board 9 is initiated.

Next, the processes for selecting a pattern element(s) out of pattern elements in the reference image, as the reference pattern element(s) used for pattern matching in detecting the position of the target image relative to the reference image, in the defect detection apparatus 1, will be described in detail. In the defect detection apparatus 1, the computer 4 implements functions which are to be exhibited by a pattern-element selection assisting apparatus for pattern matching which assists in selecting a pattern element(s) out of pattern elements in a reference image, as a reference pattern element(s).

Figure 2:
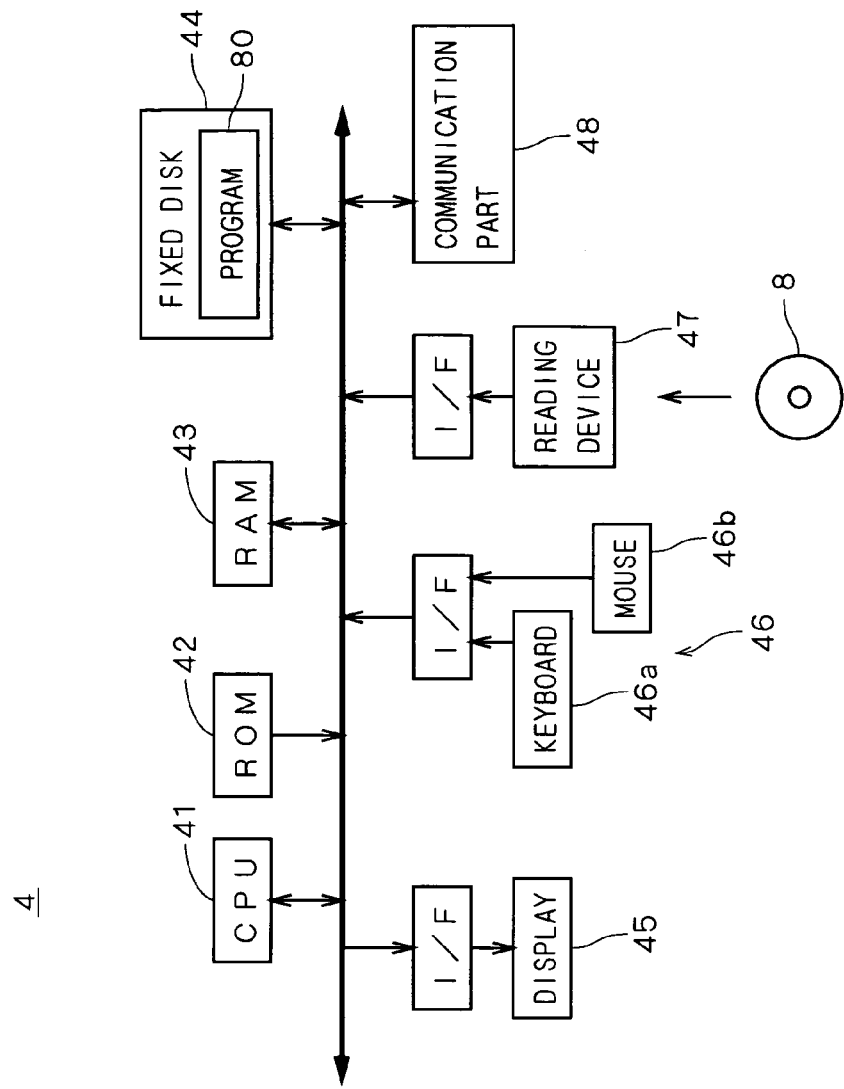
FIG. 2 illustrates a structure of a computer.

FIG. 2 illustrates a structure of the computer 4. As illustrated in FIG. 2, the computer 4 has a structure of a typical computer system which includes a CPU 41 for performing various operations, a ROM 42 for storing a basic program, and a RAM 43 for storing various kinds of information, which are connected to a bus line. Further, a fixed disk 44 for storing information, a display 45 for displaying various kinds of information such as images, a keyboard 46a and a mouse 46b (which will be hereinafter collectively referred to as an "input part 46") for accepting inputs from an operator, a reading device 47 for reading out information from a computer-readable storage medium 8 such as an optical disk, a magnetic disk, or a magneto-optical disk, and a communication part 48 for transmitting a signal to, or receiving a signal from, the other elements of the defect detection apparatus 1, are connected to the bus line each with an interface (I/F) interposed therebetween, or in other suitable ways.

In the computer 4, a program 80 is read out in advance from the storage medium 8 by the reading device 47 and stored in the fixed disk 44. Subsequently, the program 80 is copied to the RAM 43, and the CPU 41 performs an operation in accordance with the program in the RAM 43 (in other words, the CPU 41 executes the program in the RAM 43). In this manner, the computer 4 assists the operator in selecting a pattern element(s) as the reference pattern element(s).

Figure 3:
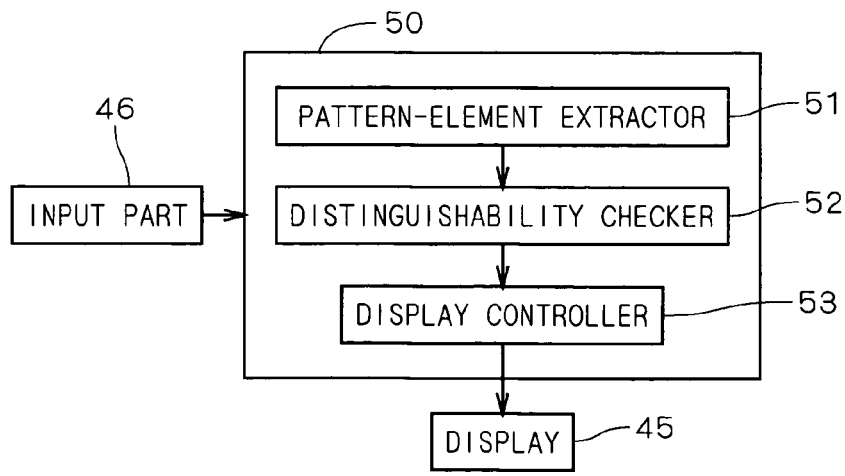
FIG. 3 is a block diagram illustrating functions implemented by the computer.

FIG. 3 is a block diagram illustrating functions implemented by the CPU 41, the ROM 42, the RAM 43, the fixed disk 44, and the like when the CPU 41 operates in accordance with the program 80, and the other elements. In FIG. 3, the blocks included in a block of an operation part 50 (i.e., a pattern-element extractor 51, a distinguishability checker 52, and a display controller 53) indicate functions implemented by the CPU 41 and the like. Additionally, all or some of the functions in the operation part 50 may be implemented by a dedicated electrical circuit.

Figure 4:
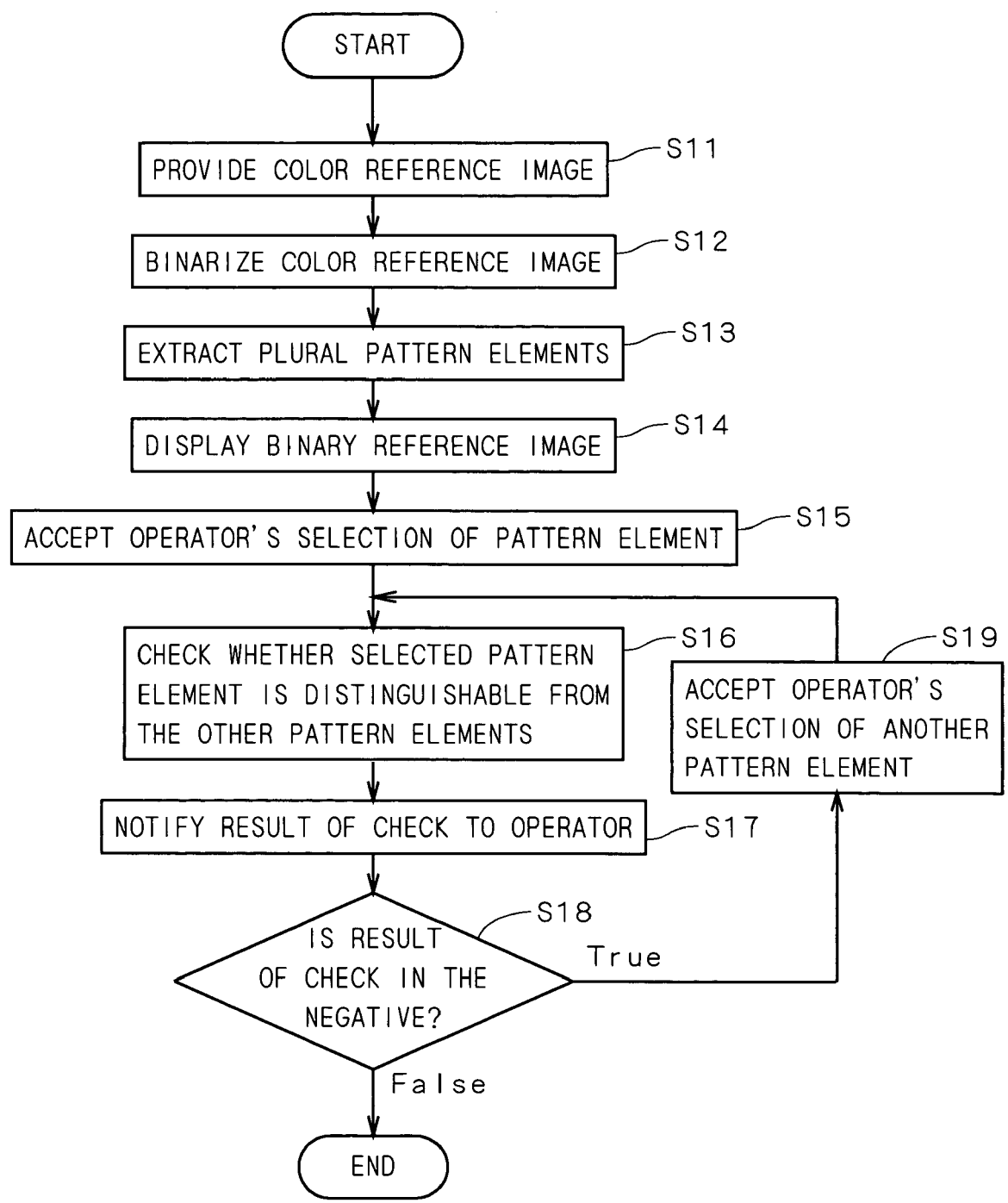
FIG. 4 is a flow chart illustrating processes for assisting in selecting a pattern element(s) as a reference pattern element(s)
Figure 5:
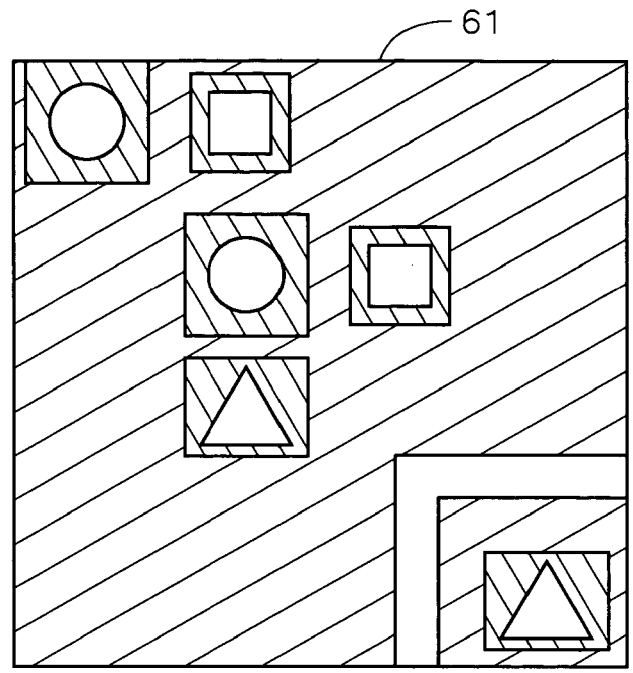
FIG. 5 illustrates a color reference image.

FIG. 4 is a flow chart illustrating processes performed by the computer 4 in assisting in selecting a pattern element(s) out of pattern elements in the reference image, as the reference pattern element(s). First, a non-defective board (which will be hereinafter referred to as a "reference board 9a") is placed on the stage 2 by the external carrying mechanism. Subsequently, an image of the reference board 9a is captured while moving the reference board 9a under control of the computer 4, so that a color reference image 61 illustrated in FIG. 5 is provided. The color reference image 61 is input to the computer 4 and reserved (step 11).

Figure 6:
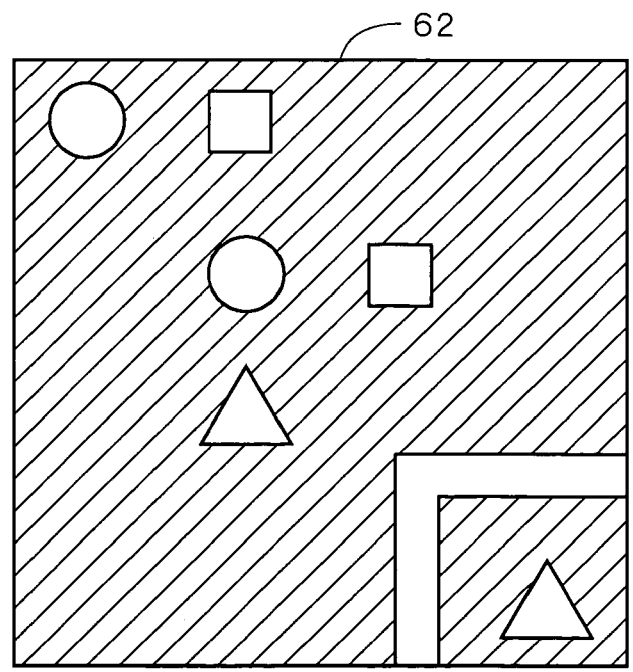
FIG. 6 illustrates a binary reference image.

The color reference image 61 is input to the pattern-element extractor 51 illustrated in FIG. 3 and binarized using a predetermined threshold value, so that a binary reference image 62 illustrated in FIG. 6 is provided (step S12). Further, the pattern-element extractor 51 identifies each of a plurality of isolated regions (which is surrounded by a region having a pixel value different from a pixel value thereof, and will be hereinafter simply referred to as a "pattern element") in the binary reference image 62 by labeling. Thus, a plurality of pattern elements are extracted (step S13). The extraction of the plurality of pattern elements in the pattern-element extractor 51 may alternatively be accomplished by dividing the color reference image 61 into a plurality of regions each of which is a set of pixels with approximate pixel values by means of a predetermined method and allocating either "0" or "1", as a pixel value, to each of the plurality of regions. In this alternative, creation of a binary reference image is accomplished at the same time as the extraction of the plurality of pattern elements.

Figure 7:
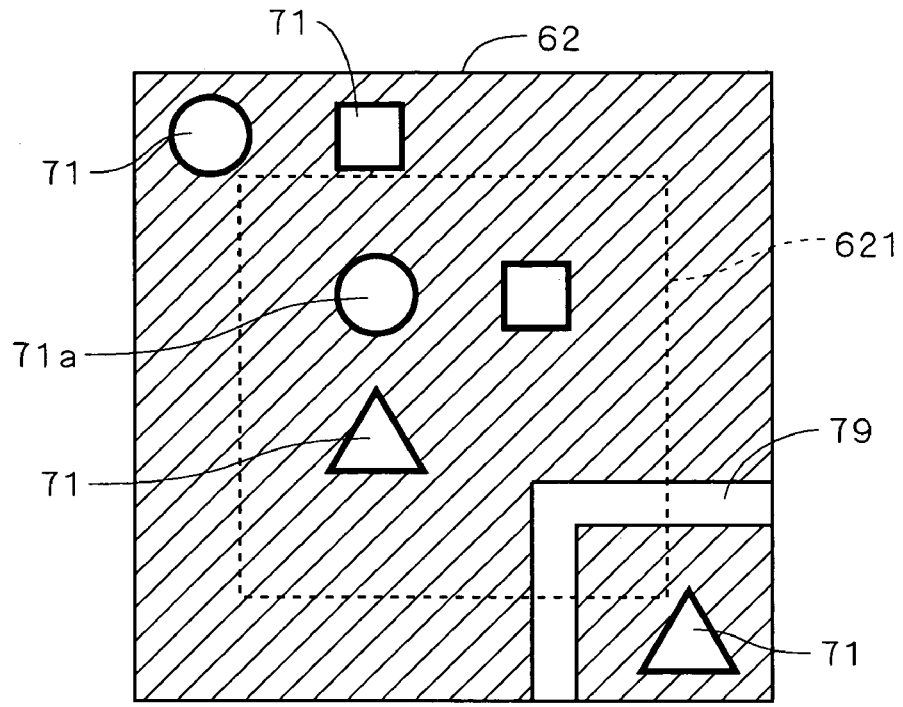
FIGS. 7, 8, 9, and 10 illustrate reference images.

FIG. 7 illustrates the reference image 62 from which a plurality of pattern elements 71 are extracted. In FIG. 7, the plurality of pattern elements 71 which are extracted are differentiated from a region 79 which has the same pixel value as the plurality of pattern elements 71 and is not isolated, by a thicker outline of each of the pattern elements 71 than that of the region 79. In the pattern-element extractor 51, the color reference image 61 is converted into the binary reference image 62, so that the plurality of pattern elements 71 are extracted. It is additionally noted that the pattern-element extractor 51 may extract only the pattern elements 71 each having a predetermined range of area or perimeter.

After the plurality of pattern elements 71 are extracted, the reference image 62 is displayed on the display 45 by the display controller 53 (step S14). At that time, only a rectangular region 621 which occupies a central region of the reference image 62 and is indicated by a broken line in FIG. 7 (in other words, a region other than a peripheral region in the reference image 62) is displayed on the display 45. The rectangular region 621 will be hereinafter referred to as a "display region 621" in the present specification. The display region 621 has the substantially same or smaller area than the target image provided when alignment for image capture is carried out.

After a region of the reference image 62 is displayed on the display 45, the input part 46 accepts the operator's selection of one pattern element 71 out of the plurality of pattern elements 71 (step S15). As an example discussed hereinafter, it is assumed that a circular pattern element 71a is selected out of the pattern elements 71 included in the display region 621 displayed on the display 45 in the reference image 62, by the operator using the mouse 46b (see FIG. 2). Upon acceptance of the operator's selection of the one pattern element 71a, the pattern element 71a is displayed in a manner clarifying that the pattern element 71a is selected by the operator, in the reference image 62 displayed on the display 45. To this end, a color of the pattern element 71a is changed, for example. In the reference image 62 illustrated in FIG. 8, the selection of the pattern element 71a is indicated by adding hatching lines to the pattern element 71a. As described above, since only the display region 621 in the reference image 62 is displayed on the display 45, only the pattern elements 71 included in the display region 621 out of all the pattern elements 71 in the reference image 62 are targets of the operator's selection.

The distinguishability checker 52 checks whether or not the pattern element 71a selected out of the plurality of pattern elements 71 is distinguishable from the other pattern elements 71, in other words, the distinguishability checker 52 checks a distinguishability of the pattern element 71a (step S16). More specifically, a value representing features ("feature value") of each of the plurality of pattern elements 71 included in the reference image 62 is obtained, and a difference in feature value between the selected pattern element 71a and each of the other pattern elements 71 is calculated. A perimeter, a barycenter, a radius, an aspect ratio, an area, out-of-roughness, or the like can be employed as the feature value, for example. Then, each of the calculated differences in feature value is compared with a predetermined threshold value. When each of all the differences in feature value is larger than the threshold value, the selected pattern element 71a is determined to be distinguishable from the other pattern elements 71. On the other hand, when even one of the differences in feature value is equal to or smaller than the threshold value (in other words, when the other pattern elements 71 include a pattern element similar to the pattern element 71a), the pattern element 71a is determined to be non-distinguishable from the other pattern elements 71. As the predetermined threshold value, a value in favor of easy detection of a pattern element similar to the selected pattern element 71a out of the other pattern elements 71 is prepared.

As an alternative, the distinguishability checker 52 can check whether or not each of all the pattern elements 71 is distinguishable from the other pattern elements 71. In this alternative, the method disclosed in JP No. 5-6421, the disclosure of which is herein incorporated by reference, can be utilized. According to the method disclosed in JP No. 5-6421, respective feature values of the plurality of pattern elements 71 included in the reference image 62 are obtained. In the distinguishability checker 52, a plurality of membership functions respectively corresponding to respective feature values of various kinds of pattern elements which are derived from a pattern on the reference board 9a and will be hereinafter referred to as "model pattern elements" are previously supplied. Operations are performed by substituting the respective feature values of the pattern elements 71 into the previously-supplied membership functions, so that a plurality of membership values respectively corresponding to the respective feature values of the pattern elements 71 are calculated. Subsequently, a conformity degree of each of the pattern elements 71 to each of the various kinds of model pattern elements is determined based on the plurality of membership values. Then, the conformity degrees are compared with one another for each of the pattern elements 71, so that each of the pattern elements 71 is identified as belonging to a category of any of the various kinds of model pattern elements.

The model pattern elements are prepared such that the number of kinds thereof is not too large, in order to allow the pattern elements 71 having shapes similar to one another to some degree to be identified as belonging to a category of the same model pattern element. In other words, with the selected pattern element 71a being tentatively recognized as the reference pattern element, detection of a pattern element as the reference pattern element is performed on the reference image 62 under conditions which allow another pattern element 71 similar to the pattern element 71a to some degree to be easily detected. Then, when only the selected pattern element 71a is identified as belonging to a category of one kind of model pattern element (in other words, when only the selected pattern element 71a is detected), the pattern element 71a is determined to be distinguishable from the other pattern elements 71 and usable as the reference pattern element for pattern matching. On the other hand, when the pattern element 71a and another pattern element 71 are identified as belonging to a category of as one kind of model pattern element (in other words, if there is another pattern element 71 similar to the pattern element 71a), the pattern element 71a is determined to be non-distinguishable from the other pattern elements 71.

Figure 8:
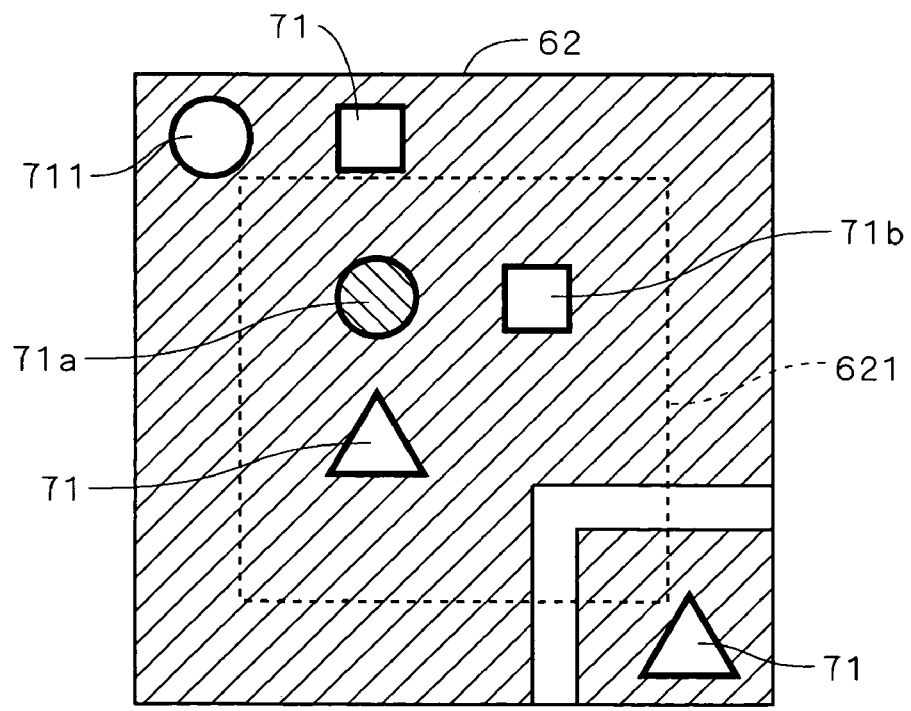

In the reference image 62 illustrated in FIG. 8, a circular pattern element 711 existing outside of the display region 621 is similar to the pattern element 71a. Accordingly, the pattern element 71a is determined to be non-distinguishable from the other pattern elements 71 and unusable as the reference pattern element for pattern matching. A result of the check is displayed on the display 45 in characters, for example, to be notified to the operator (step S17). The pattern element 711 similar to the selected pattern element 71a will be hereinafter referred to as a "similar pattern element 711" in the present specification.

In the case where the selected pattern element 71a is determined to be distinguishable from the other pattern elements 71 and usable as the reference pattern element for pattern matching in the step S16, a result of the check is correspondingly notified to the operator and the pattern element 71a is definitely recognized as the reference pattern element. Then, the pattern-element selection assisting processes are finished (steps S17 and S18).

In the case where a result of the check in the negative is notified to the operator, the operator provides an input via the input part 46, which then accepts the operator's selection of another pattern element 71 (i.e., a pattern element different from the pattern element 71a), out of the plurality of pattern elements 71 (steps S18 and S19). As an example discussed hereinafter, it is assumed that a rectangular pattern element denoted by a numeral 71b in the reference image 62 in FIG. 8 is secondarily selected. Then, the pattern element 71b is displayed in a manner clarifying that the pattern element 71b is selected by the operator, in the display region 621 of the reference image 62 displayed on the display 45. In the reference image 62 illustrated in FIG. 9, the selection of the pattern element 71b is indicated by adding hatching lines to the pattern element 71b, in the same manner as the pattern element 71a.

In the distinguishability checker 52, a difference in feature value between the pattern element 71b which is secondarily selected by the operator and each of the other pattern elements 71 is calculated, to acknowledge existence of a rectangular similar pattern element 712 which is similar to the pattern element 71b (in other words, the secondarily selected pattern element 71b is determined to be non-distinguishable from the other pattern elements 71). It is additionally noted that in the case where a check as to whether or not each of the pattern elements 71 is distinguishable from the other pattern elements 71 was made, each of the pattern elements 71 in the reference image 62 has already been identified as belonging to a category of any of the various kinds of model pattern elements by the processes described above (the processes described above may be again performed at this time). Accordingly, the existence of the similar pattern element 712 which belongs to a category of the same model pattern element as the secondarily selected pattern element 71b is promptly acknowledged.

Subsequently, a vector between respective barycenters of the two selected pattern elements 71a and 71b and a vector between respective barycenters of the two similar pattern elements 711 and 712 which are similar to the two selected pattern elements 71a and 71b, respectively, are obtained and compared with each other. Then, when one of differences in direction and magnitude between the vectors is larger than a predetermined threshold value, a combination of the two selected pattern elements 71a and 71b is determined to be distinguishable from a combination of the two similar pattern elements 711 and 712. On the other hand, when both of the differences in direction and magnitude between the vectors are equal to or smaller than the predetermined threshold values, respectively, the combination of the two selected pattern elements 71a and 71b is determined to be non-distinguishable from the combination of the two similar pattern elements 711 and 712 (step S16).

The distinguishability checker 52 checks whether or not the combination of the two pattern elements 71a and 71b selected by the operator is distinguishable from all the other possible combinations of two pattern elements 71 out of the plurality of pattern elements 71 (i.e., all the combinations of two pattern elements 71 out of the plurality of pattern elements 71 other than the combination of the two selected pattern elements 71a and 71b), in other words, the distinguishability checker 52 checks a distinguishability of the combination of the pattern elements 71a and 71b, using a positional relationship between the two selected pattern elements 71a and 71b. It is additionally noted that distinguishability checker 52 may alternatively use any other parameter which is capable of indicating the positional relationship between the two selected pattern elements for the checks, in place of a vector between barycenters ("center-to-center vector") of two pattern elements.

Figure 9:
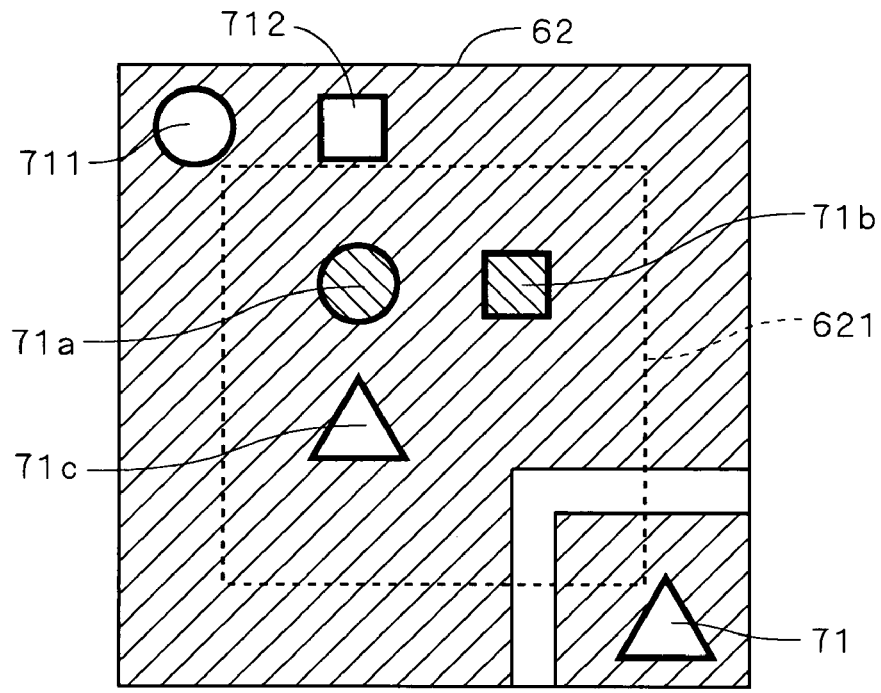

In the reference image 62 illustrated in FIG. 9, the difference in center-to-center vector between the combination of the two selected pattern elements 71a and 71b and the combination of the two similar pattern elements 711 and 712 is equal to or smaller than the threshold value. Accordingly, the combination of the two selected pattern elements 71a and 71b is determined to be non-distinguishable from the other combinations and unusable as the reference pattern elements for pattern matching. A result of the check is correspondingly displayed on the display 45 (step S17).

In the case where the combination of the two selected pattern elements 71a and 71b is determined to be distinguishable from all the other combinations of two pattern elements 71 out of the plurality of pattern elements 71, using the positional relationship between the pattern elements 71a and 71b in the step S16, a result of the check is notified to the operator and the combination of the two pattern elements 71a and 71b is definitely recognized as the reference pattern elements, so that the pattern-element selection assisting processes are finished (steps S17 and S18). As an alternative, if the secondarily selected pattern element 71b (or a pattern element 71c described later), taken singly, is distinguishable from the other pattern elements and usable as the reference pattern element for pattern matching, only the pattern element 71b may be definitely recognized as the reference pattern element.

Figure 10:
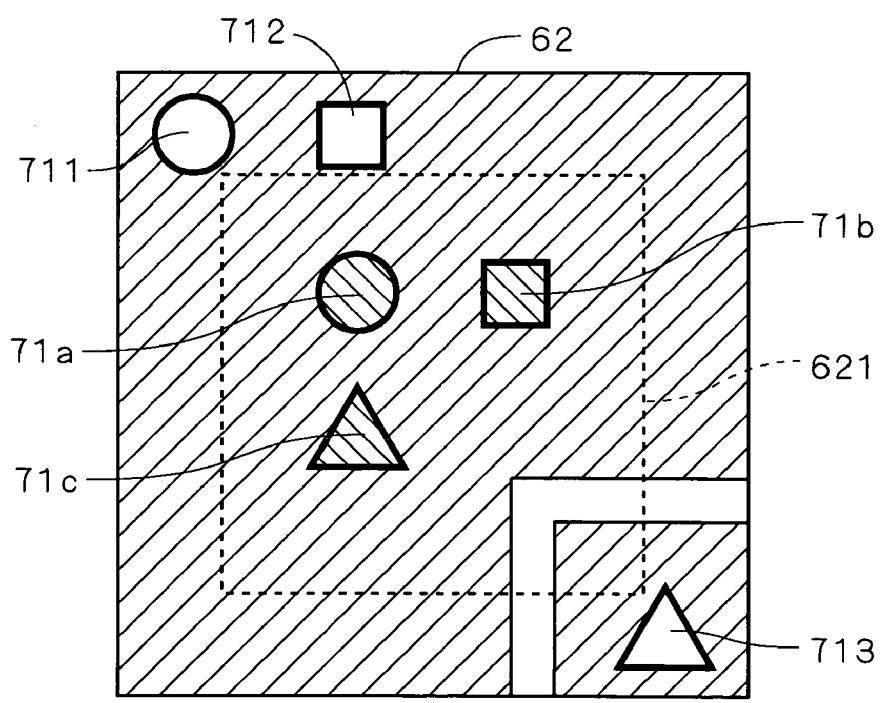

In the case where a result of the check in the negative is notified to the operator, the operator's selection of another pattern element 71 different from the pattern element 71a and the pattern element 71b out of the plurality of pattern elements 71 is accepted by the input part 46 (steps S18 and S19). As an example discussed hereinafter, it is assumed that a triangular pattern element denoted by a numeral 71c in the reference image 62 in FIG. 9 is further selected. Then, the further selected pattern element 71c is displayed in a manner clarifying the pattern element 71c is selected by the operator, as illustrated in FIG. 10.

The distinguishability checker 52 checks whether or not a combination of the three pattern elements 71a, 71b, and 71c selected by the operator is distinguishable from all the other possible combinations of three pattern elements 71 out of the plurality of pattern elements 71, using a positional relationship among the three selected pattern elements 71a, 71b, and 71c (step S16). More specifically, a similar pattern element 713 which is similar to the further selected pattern element 71c and is located outside of the display region 621 is identified, and the positional relationship among the three selected pattern elements 71a, 71b, and 71c and a positional relationship among the similar pattern elements 711, 712, and 713 are compared with each other. Since it has already been appreciated that the positional relationship between the selected pattern elements 71a and 71b and the positional relationship between the similar pattern elements 711 and 712 are analogous to each other, actually, a check as to whether or not a difference between a center-to-center vector of the triangular pattern element 71c and the circular pattern element 71a (or the rectangular pattern element 71b) and a center-to-center vector of the triangular pattern element 713 and the circular pattern element 711 (or the rectangular pattern element 712) is larger than a predetermined threshold value. When the difference is larger than the threshold value, the combination of the selected pattern elements 71a, 71b, and 71c is determined to be distinguishable from the other combinations and usable as the reference pattern elements for pattern matching. Then, a result of the check is displayed on the display 45 (step S17), and the pattern-element selection assisting processes performed by the computer 4 are ended (step S18).

When a result of the check is in the negative, the steps S16 to S19 are repeated until a result of check in the affirmative is provided. Specifically, the step in which the input part 46 accepts the operator's selection of another pattern element different from any of the pattern elements which have been already selected out of the plurality of pattern elements (step S19); the step in which the distinguishability checker 52 checks whether or not a combination of two or more pattern elements selected by the operator is distinguishable from all the other combinations of the same number of pattern elements out of the plurality of pattern elements (distinguishability), using a positional relationship between the two or more selected pattern elements (step S16), and a new result of the check is notified to the operator (step S17); and the step in which the step of accepting selection of a pattern element and the step of notifying a result to the operator are repeated when the new result is in the negative (step S18), are performed.

As described above, in the computer 4, the plurality of pattern elements 71 are extracted from the reference image 62 by the pattern-element extractor 51, and a region of the reference image 62 is displayed on the display 45. Subsequently, a pattern element 71a is selected out of the plurality of pattern elements 71 by the operator, and a check as to whether or not the selected pattern element 71a is distinguishable from the other pattern elements 71 is made by the distinguishability checker 52. Then, by referring to a result of the check made by the distinguishability checker 52, an appropriate pattern element can be selected out of the pattern elements in the reference image as the reference pattern element. As a result, it is possible to prevent misrecognition of the reference pattern element in pattern matching.

Also, in the above-described the pattern-element selection assisting processes, since a result of check made by the distinguishability checker 52 is displayed, a pattern element as the reference pattern element can be efficiently selected. When a result of check in the negative is provided, selection of the pattern element 71b or 71c different from the pattern element 71a already selected is accepted, and a check as to whether or not a combination of a plurality of pattern elements is distinguishable from the other combinations and usable as the reference pattern elements is made. Thus, pattern elements as the reference pattern elements can be efficiently selected.

Figure 11:
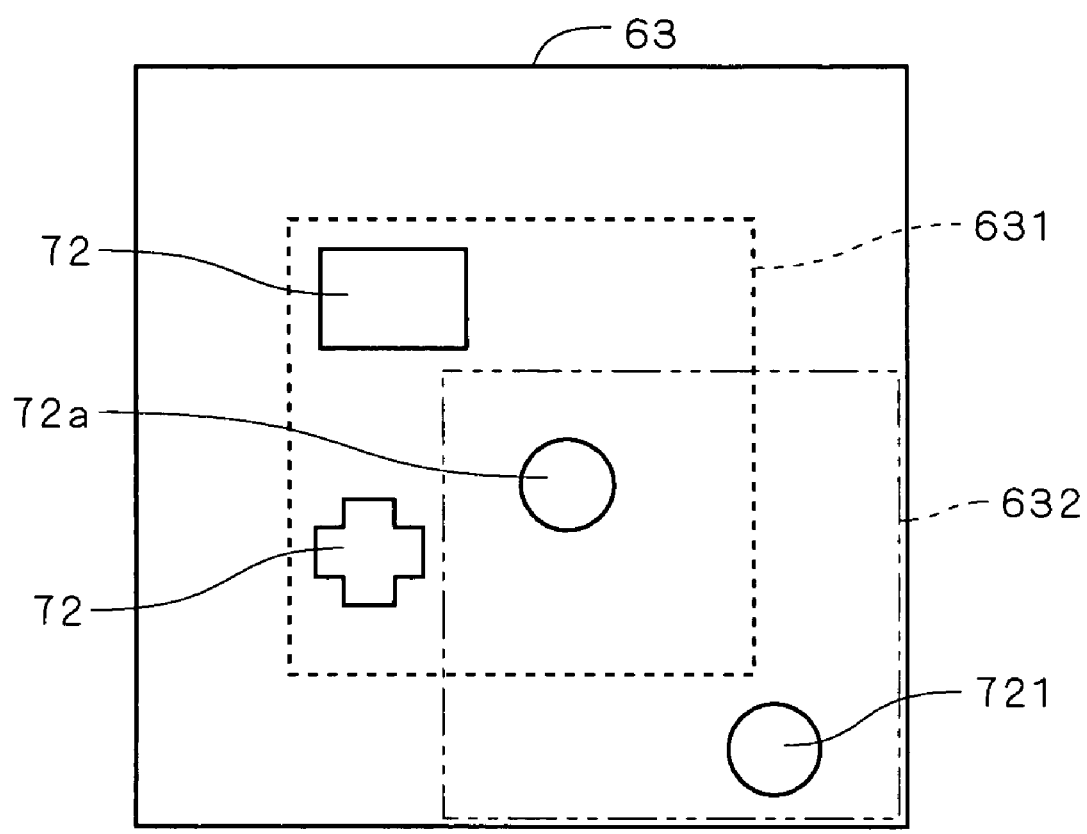
FIG. 11 is a view for explaining a display region.

Now, consider a situation in which a check as to whether or not a pattern element 72a selected out of pattern elements in a reference image 63 illustrated in FIG. 11 by the operator is distinguishable from only the pattern elements 72 included in a display region 631 is made, and the pattern element 72a is recognized as the reference pattern element. In this situation, in actually detecting a position of a target image relative to the reference image 63, there is a possibility that an image of a region on the board 9 which corresponds to a region 632 indicated by a double-dashed line in FIG. 11 is captured to provide the target image, because of misalignment which is likely to be caused due to a mechanical accuracy of the carrying mechanism for carrying the board 9 onto the stage 2, for example. In a case where the foregoing event occurs, a pattern element similar to the reference pattern element 72a (a pattern element denoted by a numeral 721 in FIG. 11) is included in the target image, which probably causes misrecognition of the reference pattern element 72a in pattern matching.

In contrast to the foregoing situation, when the computer 4 is used, only the display region 631 other than a peripheral region of the reference image 63 is displayed on the display 45, so that only pattern elements included in the display region 631, out of the plurality of pattern elements 72, are targets of the operator's selection. Then, a check as to whether or not the selected pattern element 72a is distinguishable from all the other pattern elements 72 included in the reference image 63 is made. Thus, selection of a pattern element(s) as the reference pattern element(s) can be achieved while allowing for misalignment of the target image, to thereby more surely prevent misrecognition of the reference pattern element in pattern matching. Additionally, in order to allow for misalignment of the target image, it is preferable that a pattern element located in a central portion of the display region 631 is selected as the reference pattern element. Also, when there is a need of secondarily selecting a pattern element, it is preferable to select a pattern element which can form a combination of pattern elements having a shorter center-to-center distance. Further, the display region is not necessarily required to occupy a whole region other than a peripheral region (which falls within a range causing misalignment of the target image) of the reference image 63. The display region may be part of the region other than the peripheral region of the reference image. In such case, the display region is moved to allow arbitrary portions in the region other than the peripheral region of the reference image 63 to be displayed, for example, so that pattern elements included in the region other than the peripheral region are targets of the operator's selection.

The target image (corresponding to the region 632 in FIG. 11) is not necessarily required to have the same size as the display region 631. In general, it is preferable that a pattern element selected as the reference pattern element is sufficiently smaller in size than the target image. By setting the size of the reference pattern element to be sufficiently small, even if sizes of pattern elements in the target image are varied due to variation in manufacture of the board 9, for example, troubles in pattern matching which are likely to occur when a portion of the reference pattern element lies off the target image can be suppressed. Also, by setting a size of the display region 631 to be smaller than the size of the target image, it is possible to effectively have the operator select a pattern element which is sufficiently smaller in size than the target image, as the reference pattern element.

Figure 12:
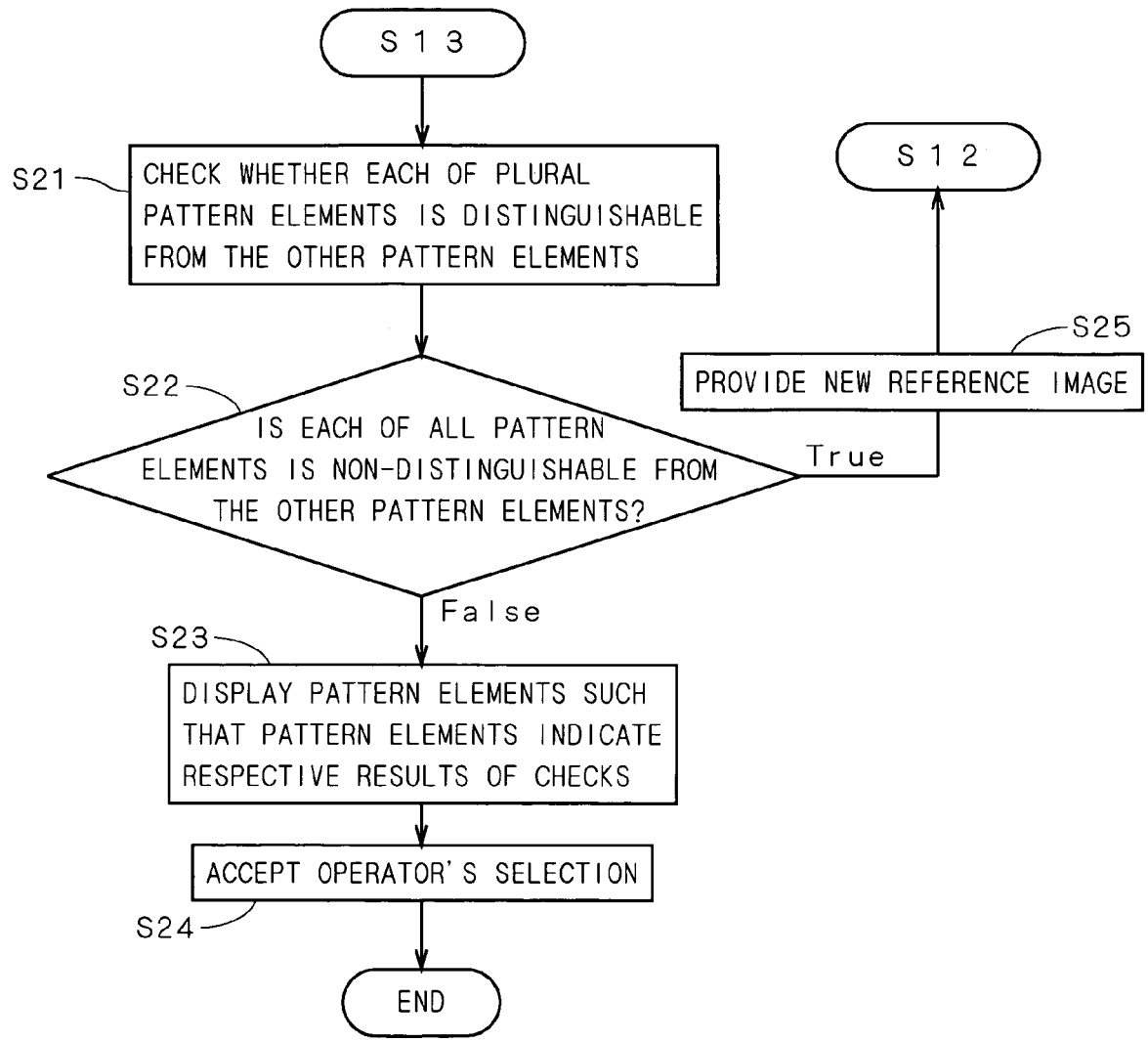
FIG. 12 is a flow chart illustrating pattern-element selection assisting processes according to a second preferred embodiment.

Next, processes for assisting in selecting a pattern element out of a plurality of pattern elements in a reference image, as the reference pattern element, according to a second preferred embodiment, will be described with reference to FIG. 12. FIG. 12 is a flow chart illustrating processes which are performed after the step S13 in the flow chart of FIG. 4.

Figure 13:
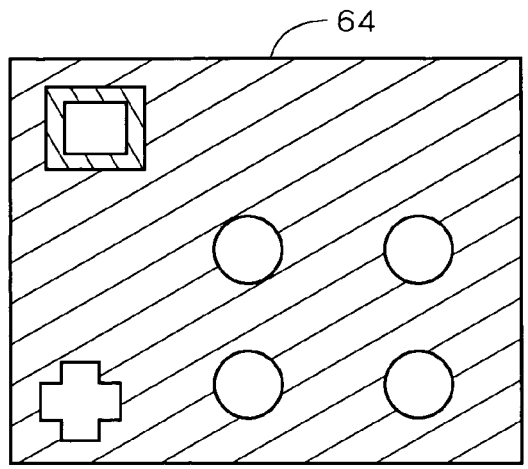
FIG. 13 illustrates a color reference image.
Figure 14:
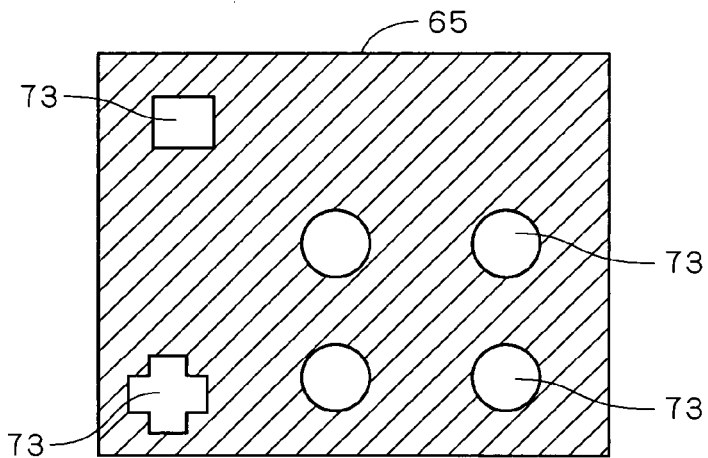
FIG. 14 illustrates a binary reference image.

According to the second preferred embodiment, after an image of a predetermined region of the reference board 9a is captured to provide a color reference image 64 illustrated in FIG. 13 (step S11, see FIG. 4), the color reference image 64 is binarized so that a binary reference image 65 illustrated in FIG. 14 is provided (step S12). Subsequently, a plurality of pattern elements 73 are extracted from the reference image 65 illustrated in FIG. 14 (step S13). Then, the distinguishability checker 52 checks whether or not each of the plurality of pattern elements 73 is distinguishable from the other pattern elements 73, in other words, the distinguishability checker 52 checks respective distinguishabilities of the plurality of pattern elements 73 (step S21).

Figure 15:
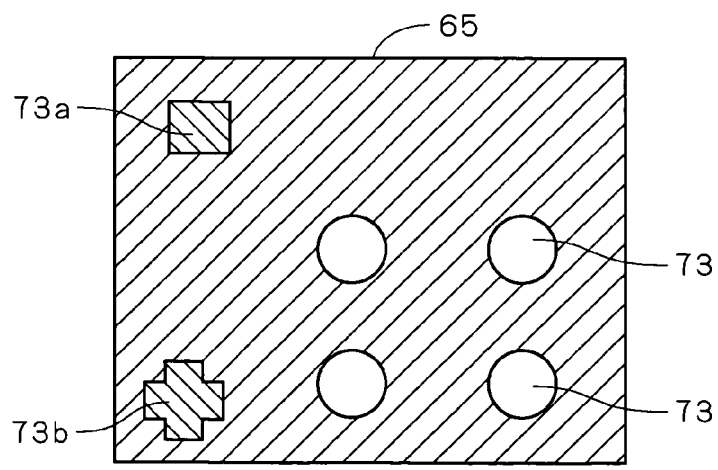
FIG. 15 illustrates a reference image.

When any of the plurality of pattern elements 73 is determined to be distinguishable from the other pattern elements 73 (step S22), the reference image 65 is displayed on the display 45 by the display controller 53 (step S23). At that time, also respective results of the checks as to the distinguishabilities of the pattern elements 73 which have been made by the distinguishability checker 52 are indicated in association with the pattern elements 73, respectively. For example, a predetermined color is added to each of the pattern elements 73 which is determined to be distinguishable in the reference image 65 displayed on the display 45, or when the operator points a cursor to one of the pattern elements 73 using the mouse 46b, characters indicating that the one pattern element 73 is distinguishable or non-distinguishable appear. In the foregoing or other manners, the results of the checks are comprehensible to the operator on the display 45. In the reference image 65 illustrated in FIG. 15, hatching lines added to pattern elements 73a and 73b indicate that each of the pattern elements 73a and 73b, taken singly, is distinguishable from the other pattern elements 73. Then, the operator's selection of one out of the pattern elements 73a and 73b as the reference pattern elements is accepted by the input part 46, so that the selected pattern element is definitely recognized as the reference pattern element (step S24), to end the pattern-element selection assisting processes.

On the other hand, when each of the plurality of pattern elements 73 is determined to be non-distinguishable from the other pattern elements 73 in the step S21 (step S22), the stage driver 21 is controlled by the computer 4 such that an image of a different region of the reference board 9a is captured to provide a new reference image (step S25). Then, the step S12, S13, and S21 to S25 are repeated on the new reference image, to more reliably select an appropriate pattern element as the reference pattern element. It is additionally noted that in a case where only one pattern element 73 is determined to be distinguishable from the other pattern elements 73 in the step S21, the one pattern element 73 may be definitely recognized as the reference pattern element in an automatic manner with no input (selection) made by the operator being accepted.

As described above, in the pattern-element selection assisting processes illustrated in the flow chart of FIG. 12, the plurality of pattern elements 73 are extracted from the reference image 65 by the pattern-element extractor 51, and checks as to whether or not each of the plurality of pattern elements 73 is distinguishable from the other pattern elements 73 are made. Subsequently, respective results of the checks as to the distinguishabilities of the plurality of pattern elements 73 are comprehensibly indicated on the display 45.

Then, out of the pattern elements 73 which have been determined to be distinguishable, one pattern element 73 is selected by the operator, so that the selected pattern element is definitely recognized as the reference pattern element. Thus, by referring to results of the checks made by the distinguishability checker 52, an appropriate pattern element can be easily selected out of the pattern elements in the reference image 65, as the reference pattern element. As a result, it is possible to prevent misrecognition of the reference pattern element in pattern matching.

Also in the pattern-element selection assisting processes illustrated in the flow chart of FIG. 12, only a central region of the reference image may be displayed and only pattern elements included in the displayed region out of all the pattern elements in the reference image may be targets of the operator's selection, to select one pattern element as the reference pattern element while allowing for misalignment, in the same manner as in the pattern-element selection assisting processes illustrated in FIG. 4. Further, in the step S21, a check as to whether or not a combination of two pattern elements is distinguishable from all the other combinations of two pattern elements out of the plurality of pattern elements in the reference image may be alternatively made. This provides for highly accurate selection of pattern elements as the reference pattern elements. Moreover, a combination of three or more pattern elements may be used as the reference pattern elements.

Hereinbefore, the preferred embodiments of the present invention have been described. However, the present invention is not limited to the above-described preferred embodiments, and various modifications are possible.

Although at least a region of a binary reference image is displayed on the display 45 according to the above-described preferred embodiments, at least a region of a color reference image or a monochrome gray-scale reference image may alternatively be displayed on the display 45.

The reference image is not necessarily required to be provided by capturing an image of the reference board 9a immediately before one pattern element is selected as the reference pattern element. Alternatively, the reference image may be provided by previously capturing an image of the reference board 9a or by utilizing a region (or a whole) of an image for reference which is produced from design data, for example. In the case where the image for reference produced from design data is utilized, a different region is cut out from the image for reference, to be used as a new reference image in the step S25 in the processes according to the second preferred embodiment. Further, the step S12 in the processes illustrated in FIG. 4 can be omitted by preparing a binary reference image beforehand in the above-described preferred embodiments.

A part of a pattern element extracted by the pattern-element extractor 51 may be dealt with as one new pattern element, depending on a shape of the pattern element. For example, when a ring-shaped pattern element is extracted, either an outer edge or an inner edge thereof may be dealt with as one new pattern element.

The target image, of which position relative to the reference image is to be detected, is not necessarily required to be obtained by capturing an image of a printed wiring board. The target image may alternatively be obtained by capturing an image of a semiconductor substrate, a glass substrate or the like, for example. Further, the target image is not necessarily required to be obtained by capturing an image. The pattern-element selection assisting apparatus can be employed for selecting a pattern element(s) as the reference pattern element(s) for pattern matching in detecting a position of each of various types of target images relative to a reference image.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2004-149859 filed in the Japan Patent Office on May 20, 2004, the entire disclosure of which is incorporated herein by reference.

What is claimed is:

1. An apparatus for assisting in selecting a pattern element from a reference image as a reference pattern element used for detecting a position of a target image relative to said reference image by pattern matching, comprising:
    a pattern-element extractor for extracting a plurality of pattern elements from a reference image;
    a distinguishability checker for checking whether or not one of said plurality of pattern elements is distinguishable from the other pattern elements and usable as a reference pattern element for pattern matching;
    a display for displaying at least part of said reference image; and
    an input part for accepting an operator's selection of a pattern element out of said plurality of pattern elements as a reference pattern element, wherein
    said distinguishability checker checks whether or not a pattern element selected by said operator via said input part is distinguishable from the other pattern elements, and a result of the check is notified to said operator, wherein
    when said result of check is in the negative, said input part accepts said operator's selection of another pattern element out of said plurality of pattern elements, and
    said distinguishability checker checks whether or not a combination of two pattern elements selected by said operator is distinguishable from all the other combinations of two pattern elements out of said plurality of pattern elements, using a positional relationship between said two pattern elements selected by said operator.

2. An apparatus for assisting in selecting a pattern element from a reference image as a reference pattern element used for detecting a position of a target image relative to said reference image by pattern matching, comprising:
    a pattern-element extractor for extracting a plurality of pattern elements from a reference image;
    a distinguishability checker for checking whether or not one of said plurality of pattern elements is distinguishable from the other pattern elements and usable as a reference pattern element for pattern matching;
    a display for displaying at least part of said reference image; and
    an input part for accepting an operator's selection of a pattern element out of said plurality of pattern elements as a reference pattern element, wherein
    said distinguishability checker checks whether or not a pattern element selected by said operator via said input part is distinguishable from the other pattern elements, and a result of check is notified to said operator, and
    when said result of check is in the negative:
        a) a step in which said input part accepts said operator's selection of another pattern element out of said plurality of pattern element;
        b) a step in which said distinguishability checker checks whether or not a combination of two or more pattern elements selected by said operator is distinguishable from all the other combinations of the same number of pattern elements out of said plurality of pattern elements using a positional relationship among said two or more pattern elements selected by said operator, and notifies a new result of check to said operator; and
        c) a step of repeating said step a) and said step b) when said new result of check is in the negative,
    are performed.

3. An apparatus for assisting in selecting a pattern element from a reference image as a reference pattern element used for detecting a position of a target image relative to said reference image by pattern matching, comprising:
    a pattern-element extractor for extracting a plurality of pattern elements from a reference image;
    a distinguishability checker for checking whether or not one of said plurality of pattern elements is distinguishable from the other pattern elements and usable as a reference pattern element for pattern matching;
    a display for displaying at least part of said reference image; and
    an input part for accepting an operator's selection of a pattern element out of said plurality of pattern elements as a reference pattern element, wherein
    said distinguishability checker checks whether or not each of said plurality of pattern elements is distinguishable from the other pattern elements, and
    said apparatus further comprises a display controller for indicating a result of check made by said distinguishability checker in association with each pattern element displayed on said display.

4. The apparatus according to claim 3 wherein when each of said plurality of pattern elements is determined to be non-distinguishable from the other pattern elements by said distinguishability checker, a new reference image is provided.

5. The apparatus according to claim 1, wherein said display displays a region other than a peripheral region of said reference image, and
    a pattern element included in said region out of said plurality of pattern elements is a target of said operator's selection.

6. A method of assisting in selecting a pattern element from a reference image as a reference pattern element used for detecting a position of a target image relative to said reference image by pattern matching, comprising the steps of:
    a) extracting a plurality of pattern elements from a reference image;
    b) displaying at least part of said reference image;
    c) accepting an operator's selection of a pattern element out of said plurality of pattern elements as a reference pattern element after said step b);
    d) checking whether or not one out of said plurality of pattern elements is distinguishable from the other pattern elements and usable as a reference pattern element for pattern matching; wherein a check as to whether or not a pattern element selected by said operator is distinguishable from the other pattern elements is made, and a result of check is notified to said operator;
    e) accepting said operator's selection of another pattern element out of said plurality of pattern elements when said result of check is in the negative; and
    f) checking whether or not a combination of two pattern elements selected by said operator is distinguishable from all the other combinations of two pattern elements out of said plurality of pattern elements using a positional relationship between said two pattern elements selected by said operator.

7. A method of assisting in selecting a pattern element from a reference image as a reference pattern element used for detecting a position of a target image relative to said reference image by pattern matching, comprising the steps of:
   a) extracting a plurality of pattern elements from a reference image;
   b) displaying at least part of said reference image;
   c) accepting an operator's selection of a pattern element out of said plurality of pattern elements as a reference pattern element after said step b);
   d) checking whether or not one out of said plurality of pattern elements is distinguishable from the other pattern elements and usable as a reference pattern element for pattern matching, wherein a check as to whether or not a pattern element selected by said operator is distinguishable from the other pattern elements is made, and a result of check is notified to said operator;
   g) accepting said operator's selection of another pattern element out of said plurality of pattern elements when said result of check is in the negative;
   h) checking whether or not a combination of two or more pattern elements selected by said operator is distinguishable from all the other combinations of the same number of pattern elements out of said plurality of pattern elements, using a positional relationship among said two or more pattern elements selected by said operator, and notifying a new result of check to said operator; and
   i) repeating said steps g) and h) when said new result of check is in the negative.

8. A method of assisting in selecting a pattern element from a reference image as a reference pattern element used for detecting a position of a target image relative to said reference image by pattern matching, comprising the steps of:
   a) extracting a plurality of pattern elements from a reference image;
   b) checking whether or not one out of said plurality of pattern elements is distinguishable from the other pattern elements and usable as a reference pattern element for pattern matching;
   c) displaying at least part of said reference image and
   d) accepting an operator's selection of a pattern element out of said plurality of pattern elements as a reference pattern element after said step c); wherein
   said step b) is performed on each of said plurality of pattern elements, and
   a result of the check made in said step b) is indicated in association with each pattern element displayed, in said step c).

9. The method according to claim 8, wherein
   when each of said plurality of pattern element is determined to be non-distinguishable from the other pattern elements, a new reference image is provided.

10. The method according to claim 6, wherein
    a region other than a peripheral region of said reference image is displayed in said step b), and
    a pattern element included in said region out of said plurality of pattern elements is a target of said operator's selection.

11. A computer-readable medium carrying a program for causing a computer to assist an operator in selecting a pattern element from a reference image as a reference pattern element used for detecting a position of a target image relative to said reference image by pattern matching, wherein execution of said program by a computer causes said computer to perform the steps of:
   a) extracting a plurality of pattern elements from a reference image;
   b) displaying at least part of said reference image;
   c) accepting an operator's selection of a pattern element out of said plurality of pattern elements as a reference pattern element after said step b);
   d) checking whether or not one out of said plurality of pattern elements is distinguishable from the other pattern elements and usable as a reference pattern element for pattern matching, wherein a check as to whether or not a pattern element selected by said operator is distinguishable, from the other pattern elements is made, and a result of check is notified to said operator;
   e) accepting said operator's selection of another pattern element out of said plurality of pattern elements when said result of check is in the negative; and
   f) checking whether or not a combination of two pattern elements selected by said operator is distinguishable from all the other combinations of two pattern elements out of said plurality of pattern elements using a positional relationship among said two pattern elements selected by said operator.

12. A computer-readable medium carrying a program for causing a computer to assist an operator in selecting a pattern element from a reference image as a reference pattern element used for detecting a position of a target image relative to said reference image by pattern matching, wherein execution of said program by a computer causes said computer to perform the steps of:
   a) extracting a plurality of pattern elements from a reference image;
   b) displaying at least part of said reference image;
   c) accepting an operator's selection of a pattern element out of said plurality of pattern elements as a reference pattern element after said step b);
   d) checking whether or not one out of said plurality of pattern elements is distinguishable from the other pattern elements and usable as a reference pattern element for pattern matching, wherein a check as to whether or not a pattern element selected by said operator is distinguishable from the other pattern elements is made, and a result of check is notified to said operator;
   g) accepting said operator's selection of another pattern element out of said plurality of pattern elements when said result of check is in the negative;
   h) checking whether or not a combination of two or more pattern elements selected by said operator is distinguishable from all the other combinations of the same number of pattern elements out of said plurality of pattern elements, using a positional relationship among said two or more pattern elements selected by said operator, and notifying a new result of check to said operator; and
   i) repeating said steps g) and h) when said new result of check is in the negative.

13. A computer-readable medium carrying a program for causing a computer to assist an operator in selecting a pattern element from a reference image as a reference pattern element used for detecting a position of a target image relative to said reference image by pattern matching, wherein execution of said program by a computer causes said computer to perform the steps of:
   a) extracting a plurality of pattern elements from a reference image;

b) checking whether or not one out of said plurality of pattern elements is distinguishable from the other pattern elements and usable as a reference pattern element for pattern matching;

c) displaying at least part of said reference image;

d) accepting an operator's selection of a pattern element out of said plurality of pattern elements as a reference pattern element after said step c);

wherein said step b) is performed on each of said plurality of pattern elements, and a result of the check made in said step b) is indicated in association with each pattern element displayed, in said step c).

14. The computer-readable medium according to claim 13, wherein when each of said plurality of pattern elements is determined to be non-distinguishable from the other pattern elements, a new reference image is provided by execution of said program by said computer.

15. The computer-readable medium according to claim 11, wherein a region other than a peripheral region of said reference image is displayed in said step b), and a pattern element included in said region out of said plurality of pattern elements is a target of said operator's selection.

16. The apparatus according to claim 2, wherein said display displays a region other than a peripheral region of said reference image, and a pattern element included in said region out of said plurality of pattern elements is a target of said operator's selection.

17. The apparatus according to claim 3, wherein said display displays a region other than a peripheral region of said reference image, and a pattern element included in said region out of said plurality of pattern elements is a target of said operator's selection.

18. The method according to claim 7, wherein a region other than a peripheral region of said reference image is displayed in said step b), and a pattern element included in said region out of said plurality of pattern elements is a target of said operator's selection.

19. The method according to claim 8, wherein a region other than a peripheral region of said reference image is displayed in said step c), and a pattern element included in said region out of said plurality of pattern elements is a target of said operator's selection.

20. The computer-readable medium according to claim 12, wherein a region other than a peripheral region of said reference image is displayed in said step b), and a pattern element included in said region out of said plurality of pattern elements is a target of said operator's selection.

21. The computer-readable medium according to claim 13, wherein a region other than a peripheral region of said reference image is displayed in said step c), and a pattern element included in said region out of said plurality of pattern elements is a target of said operator's selection.

* * * * *